Oct. 31, 1944.        R. L. MELTON ET AL        2,361,784
             METHOD OF MOLDING CERAMIC BODIES
                    Filed Nov. 28, 1938
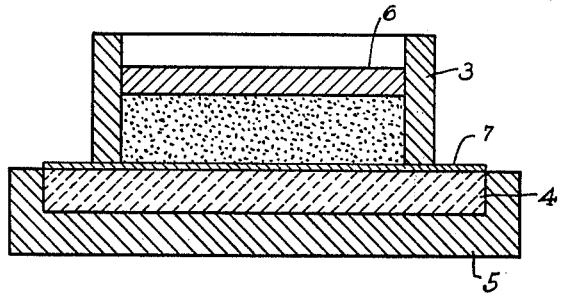
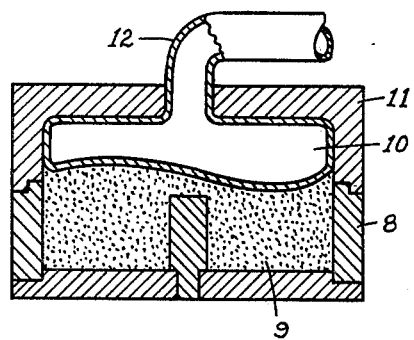
INVENTORS.
ROMIE L. MELTON
HENRY P. KIRCHNER
RAYMOND C. BENNER
BY
ATTORNEY.

Patented Oct. 31, 1944

2,361,784

UNITED STATES PATENT OFFICE 2,361,784

METHOD OF MOLDING CERAMIC BODIES

Romie L. Melton, Henry P. Kirchner, and Raymond C. Benner, Niagara Falls, N. Y., assignors to The Carborundum Company, Niagara Falls, N. Y., a corporation of Delaware Application November 28, 1938, Serial No. 242,682

2 Claims. (Cl. 51—293)

This invention relates to a process of making ceramic articles such as abrasives, refractories, grinding wheels, filtering media, tile and the like. More particularly, it relates to a process of making ceramic bonded articles and especially ceramic bonded abrasive articles in which a temporary binder is used in the form of an organic dispersion or emulsion.

This application is a continuation-in-part application of our application Serial No. 45,142, filed October 15, 1935, which was issued March 7, 1939, as Patent No. 2,150,034.

Abrasive products are generally formed by a pressing or a casting process. In the pressed wheel process abrasive granules, permanent bond and a small amount of a temporary binder are mixed with a small amount of water, just enough water being used to cause the mix to cohere after pressing. In the puddled wheel or slip-casting process a much larger amount of water, together with a small amount of temporary binder, is used in order that the mix may be poured or cast into molds.

It is an object of the present invention to form ceramic bonded abrasive articles by an improved casting process whereby the mix for casting is rendered plastic by the use of temporary binders such as emulsions or dispersions.

It is a further object of the invention to improve the casting method of forming abrasives by the use of plastic mixes whereby the desired plasticity is obtained by the use of smaller amounts of water. In practicing the method of the present invention the "green" strength of the formed articles prior to maturing of the final permanent bond is highly satisfactory and the required drying time is often appreciably lowered. Other objects of the invention will become apparent from the description.

In accordance with the present invention a satisfactory method of forming a plastic mix comprises introducing the permanent powdered bond and abrasive granules into a carrier such as an emulsion of stearic acid, wax, oil, or a similar heat-decomposable substance in water. The consistency of these emulsions can be varied over a wide range, and the mixture of bond and emulsion can be made so as to be of about the same consistency as cold cream. If desired, the amount of emulsion used can be proportioned so as to fill all of the pore spaces in the consolidated mix.

Instead of using an organic emulsion such as has been shown above, another satisfactory method of forming a plastic mix is by incorporation of the abrasive particles and the dry powdered permanent bond into an artificial dispersion of rubber or rubber-like material having a thick creamy consistency, the dispersion acting as a carrier for the permanent bond and abrasive particles.

Having generally described the invention, several specific examples are now given by way of illustration, it being understood that these examples are for illustration only and are not intended to limit the invention in any way.

Example I

A casting mixture is prepared by mixing the abrasive particles and a ceramic bond with a linseed oil emulsion. The casting mixture is made up of the following ingredients and in the following proportions:

| | Grams |
|---|---|
| 36 grit white fused alumina | 940 |
| 40 grit white fused alumina | 940 |
| Finely powdered raw ceramic bond composition | 120 |
| Aqueous wetting agent solution containing 1¼ grams of an alkylated sulphonated aromatic wetting agent | 10 |
| Water | 350 |
| Linseed oil emulsion | 50 |

In preparing the above casting mixture the solid ingredients are first thoroughly and uniformly mixed with the wetting agent and water, after which the resulting batch is admixed with the linseed oil emulsion.

The linseed oil emulsion used above is prepared as follows. Ten grams of concentrated aqua ammonia of specific gravity 0.90 are mixed with 200 grams of boiled linseed oil, and 200 grams of water stirred into the mixture. The emulsion is made more uniform and stable by pumping it through a homogenizer twice.

Example II

In this example dispersed rubber serves to suspend the abrasive particles and pulverized ceramic bond to give a casting mixture of the necessary plasticity, and also give green strength to the cast object. The casting mixture consists of the following:

| | Grams |
|---|---|
| 40 grit fused alumina | 1,840 |
| Finely pulverized ceramic bond | 160 |
| Aqueous wetting agent solution containing 2½ grams solid alkylated, sulphonated aromatic wetting agent | 20 |
| Dispersed rubber in water containing 40% of previously coagulated rubber solids and 10% bentonite | 100 |

The wetting agent makes the mix more fluid and reduces the amount of water necessary to make a castable mix.

In casting articles using the plastic mixes prepared in the above manner various methods of fabrication can be used. In casting comparatively thin articles, e. g. grinding wheels of 8" diameter by ½" thickness a mold set-up may be used such as that illustrated in Figure 1 and herein described. After casting the wheel the mold and contents are preferably dried overnight at 150° F. in an oven whereupon it acquires sufficient rigidity for handling. The casting is then discharged from the mold and further oven-dried to remove any remaining moisture. The cast and dried article is then fired to burn off the organic matter and fuse the ceramic bond to give the final product.

In casting thicker pieces a mold set-up similar to that shown in Figure 2 can be used in which event the abrasive particles in the plastic mix can, if desired, be oriented in the manner set forth in detail in our copending application Serial No. 45,142 filed October 15, 1935.

It has sometimes been found advantageous in promoting drying to use molds in which not only the bottom bat, but the entire mold is made of plaster of Paris or other porous water-absorbent material. In such event the molds, previous to casting, are lubricated with mica suspended in a soap solution, or some other agent to prevent a plugging of the mold pores or a too rapid and uneven withdrawal of water from the mix.

In casting articles from the plastic mixes prepared as above the casting procedure can be carried out in molding devices such as illustrated in the accompanying figures wherein:

Figure 1 shows a vertical cross-section of a mold suitable for forming thin articles such as grinding wheels; and Figure 2 shows a vertical view mostly in cross-section of a molding device for casting thick objects, and which is particularly adaptable for use where it is desired to orient the abrasive particles.

In Figure 1 the mold 3 rests on a porous bat 4 which is suitably supported on a base 5. A follower plate 6 may be used to confine the casting mix. Pressure may be applied at any time during the forming stage to the follower plate if desired. The bat 4 is covered with paper 7 and the wet plastic mix is introduced into the mold, and a certain proportion of the water is absorbed into the porous bat. The top of the mix is tamped gently to remove air bubbles and, when the mix becomes plastic and loses its extreme fluidity, consolidation can be effected by jolting.

In Figure 2 is shown a molding device for molding thicker pieces whereby pressure may be applied so that the individual sections of the mix can be compressed vertically without causing a substantial lateral movement of the abrasive particles through the mix. In this device fluid pressure may be applied by means of a confined rubber bag or other flexible medium which will conform to any irregularity of the top surface caused by non-uniform vertical consolidation without pressing out these irregularities so as to cause lateral movement. In Figure 2, the wheel mold is represented by 8. The mix 9 undergoing consolidation is subjected to vertical pressure through the flexible container 10, which is completely confined in the upper half of the mold 11 and can withstand a moderately high pressure. Fluid pressure is applied through the opening 12. If necessary, the top surface of the mix can be sprinkled with a finely powdered non-abrasive material in order to prevent the puncturing of the container under high pressure. This method of applying pressure can also be combined with jolting and is found to be particularly useful in preventing rebound of the mix.

In the present specification and claims where reference is made to "dispersions" and "emulsions" the common scientific meaning given to these terms in colloidal chemistry parlance is intended. That is, "dispersion" is the broader term of the two, meaning a suspension of one substance (whether solid or liquid) called the dispersed phase suspended in a second material called the disperse medium. An "emulsion" is herein considered to be a dispersion of one liquid in minute globular form suspended in a liquid medium.

While the examples given have been specific to alumina abrasive articles, other abrasives may be used such as silicon carbide, boron carbide, and the like; or similarly ceramic articles such as filtering media, tiles, refractory shapes and the like can be made without departing from the present invention. Likewise, besides those previously mentioned, other waxes, oils, organic fatty acids, synthetic or artificial rubber, and similar heat-decomposable substances may be used in dispersed or emulsified form within the scope of the present invention.

Having described the process and product in full, the scope of the invention is defined by the following claims:

We claim:

1. In the method of making a ceramic bonded abrasive article the steps which comprise forming an emulsion of stearic acid in water as a carrier, suspending in said emulsion a mixture of abrasive particles and pulverized ceramic bond in amounts sufficient to form a castable fluid mix, placing the mix in a mold and consolidating to form an article of desired shape, drying the said formed article, and firing to remove the stearic acid and unite the ceramic material.

2. In the method of making a ceramic bonded abrasive article the steps which comprise forming an organic emulsion of oil in water as a carrier, suspending in said emulsion a mixture of abrasive particles and pulverized ceramic bond in amounts sufficient to form a castable fluid mix, placing the mix in a mold and consolidating to form an article of desired shape, drying the said formed article, and firing to remove the organic emulsion of oil in water and unite the ceramic material.

ROMIE L. MELTON.
HENRY P. KIRCHNER.
RAYMOND C. BENNER.